Jan. 20, 1959

R. L. CARE 2,869,776

THROUGHWAY FARE COLLECTION DEVICE

Filed March 22, 1955

INVENTOR.
Richard L. Care
BY Nathaniel Frucht
Atty

Jan. 20, 1959    R. L. CARE    2,869,776
THROUGHWAY FARE COLLECTION DEVICE
Filed March 22, 1955    3 Sheets-Sheet 2

INVENTOR.
Richard L. Care
BY Nathaniel Frucht
Atty

United States Patent Office 2,869,776
Patented Jan. 20, 1959

2,869,776

THROUGHWAY FARE COLLECTION DEVICE

Richard L. Care, Rumford, R. I., assignor, by mesne assignments, to Grant Development Company, Providence, R. I., a corporation of Rhode Island Application March 22, 1955, Serial No. 495,867

6 Claims. (Cl. 232—7)

This invention relates to a fare device and more specifically to the combination of fare collecting means and a barrier of some sort.

A principal object of this invention is the provision of fare collecting means wherein the fares drop onto an inspection plate, and means for clearing the inspection plate responsive to the passage of a depositor through a restricted area.

Another object is the provision of fare collecting means wherein the inspection plate is cleared without the aid and beyond the control of an attendant.

Another object is the provision of means for stopping passage of a depositor through a barrier or turnstile by an attendant by remote control.

A futher object is the provision of a collecting or receiving device in combination with a barrier or turnstile but located remotely therefrom, whereby the inspection plate in the collecting device is emptied as the barrier or turnstile is contacted.

Still another object is the provision of a collecting device in combination with a barrier wherein the former is not a part of the latter but rather is a separable and portable unit in itself.

A still further object is the provision of remote control means for locking or opening a barrier or turnstile.

Another object is the provision of a fare controlled turnstile wherein the fares are not deposited into the turnstile.

A further object is the provision of a fare receiver or collector of the multiple throw variety in combination with a barrier or turnstile.

Other objects, features and advantages of the invention will become apparent as the description thereof proceeds when considered in connection with the accompanying illustrative drawings.

In the drawings which illustrate the best mode presently contemplated by me for carrying out my invention:

Fare cabinet and receiver assembly

Figure 1:
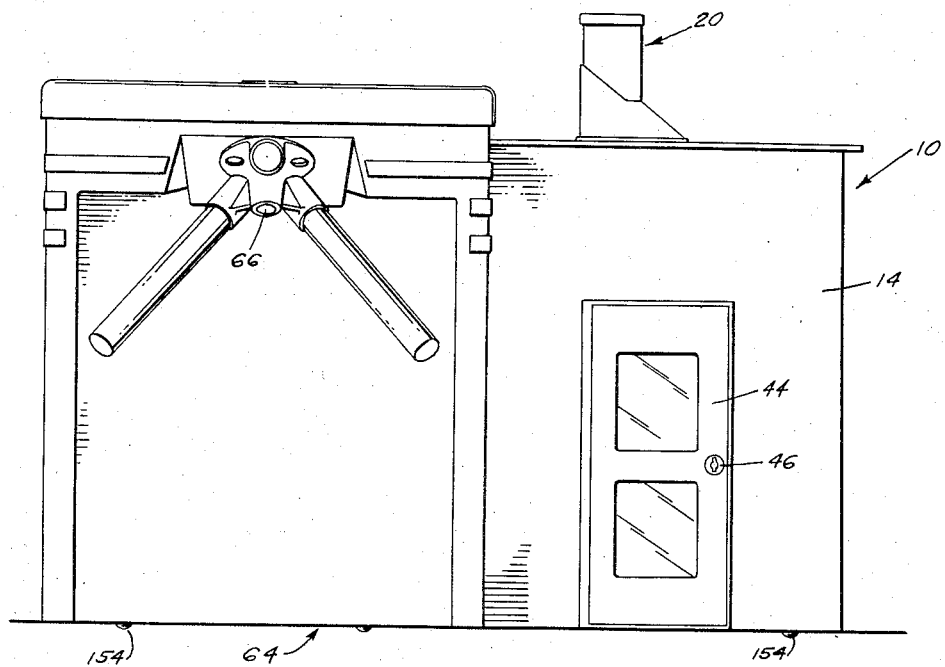
Fig. 1 is a side elevation of a turnstile and fare collection means embodied in my invention.
Figure 1:
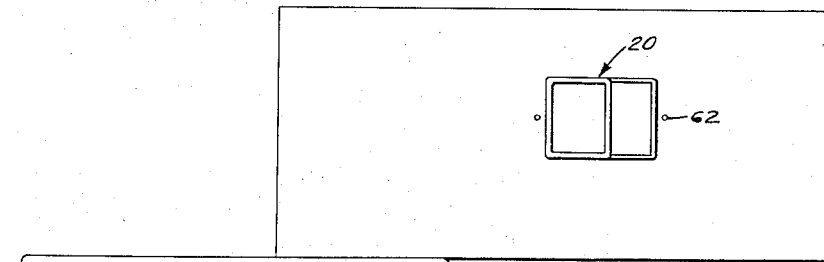
Figure 2:
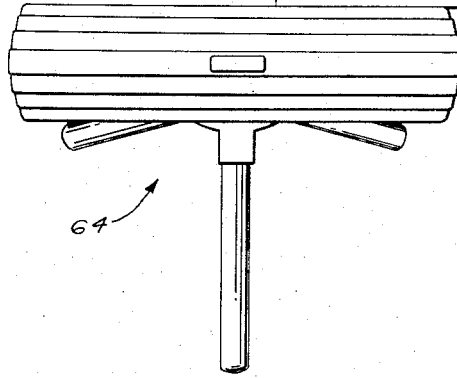
Fig. 2 is a top plan view thereof.

Referring to the drawings, and more particularly to Figs. 1 to 4 thereof, there is provided a substantially rectangular housing shown generally at 10, having side walls 12, a front wall 14 and a top wall 16. Wall 16 has formed therein an opening 18. Mounted on the upper surface of wall 16 and surrounding the opening 18 is a receiver head generally shown at 20. Receiver head 20 comprises a relatively large drop inlet 22, an inwardly extending and downwardly inclined bounce plate 24 and a pivotally mounted inspection plate 26 terminating in a wedge-shape inspection area 27. When a multiple throw fare is dropped into the inlet 22, whether it comprises a plurality of coins, tickets or both, said fare will be separated and scattered on the inspection plate 26 for ready visual inspection by an attendant.

Figure 4:
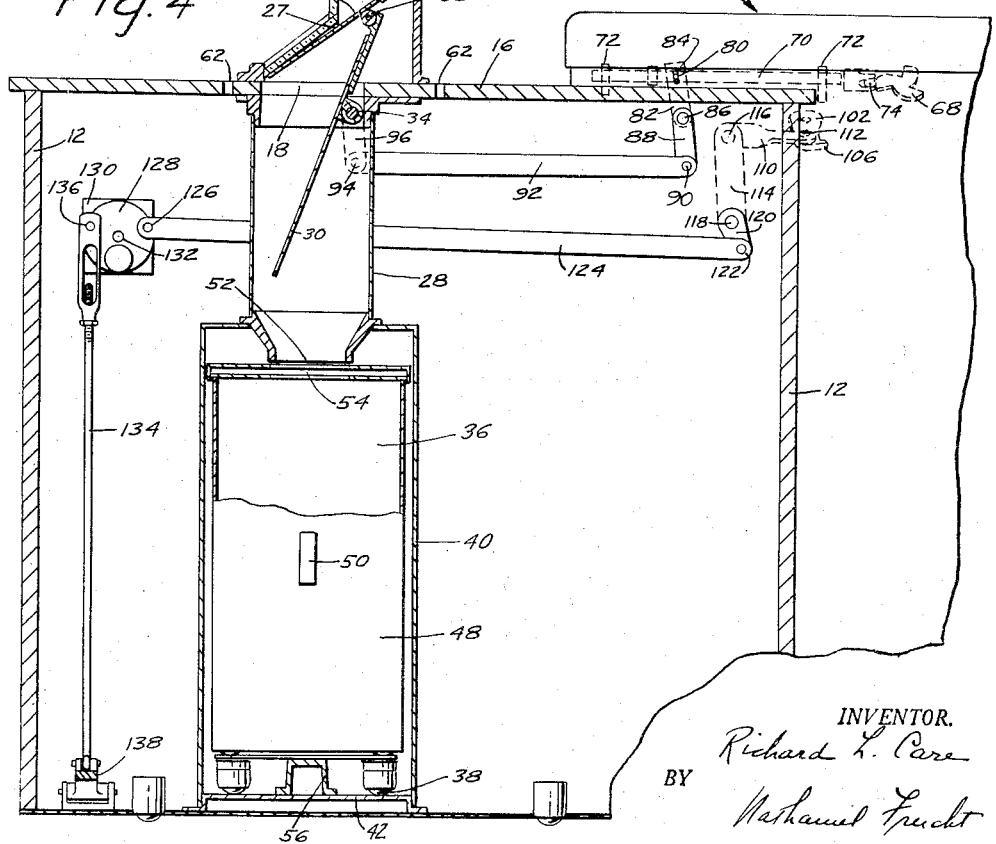
Fig. 4 is a fragmentary sectional view, partly in perspective on an enlarged scale, taken on line 4—4 of Fig. 3.

Secured to the lower surface of wall 16 and underlying the receiver head is a chute 28 into which the fares are adapted to drop when inspection plate 26 is released. In Fig. 4 the inspection plate is shown in its closed position and is maintained in said position by a baffle plate 30 having a roller 32 mounted thereon. Baffle plate 30 is secured to a rock shaft 34, thus it will be apparent that when a clockwise rotation is imparted to said rock shaft in a manner to be subsequently described, roller 32 will move away to allow inspection plate 26 to drop open by gravity, while at the same time the lower end of plate 30 will move to a position wherein it blocks chute 28. This entire operation, as well as the receiver head structure, is the subject matter of my copending application Serial No. 494,362 filed March 15, 1955, now Patent No. 2,835,439, granted May 20, 1958.

When rock shaft 34 is in the position of Fig. 4, the previous fare will empty into a container or lock box 36 having roller feet 38. Lock box 36 is positioned within an enclosure 40 having a bottom wall 42 and a front door 44 adapted to be locked against unauthorized entry, as at 46, note Fig. 1. The front wall 48 of lock box 36 has a handle 50 thereon, thus when it is desired to remove the lock box for any reason, it is simply necessary to unlock and open door 44 whereupon handle 50 may be grasped and the lock box can easily be rolled out of its enclosure.

It will be understood that the upper walls of enclosure 40 and lock box 36 are provided with registered openings 52 and 54, respectively, in order to allow the fares to drop freely downward. When the lock box is removed from its enclosure, however, cam means, not shown and forming no part of the instant invention, automatically actuates a closure for covering the opening 54. An inverted, substantially U-shape bracket 56, secured to bottom wall 42, will serve to maintain the lock box at the proper height for said cam means to be effective, should the roller feet 38 wear down appreciably.

Figure 7:
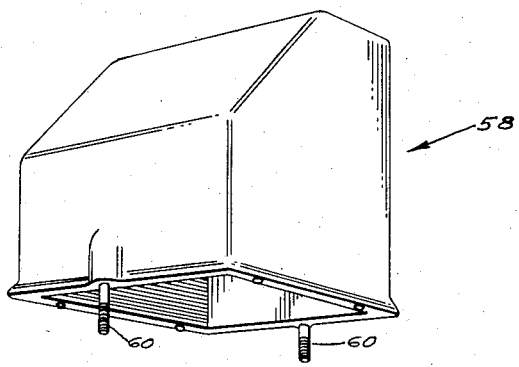
Fig. 7 is a perspective view of a fare receiver cover utilized in the instant invention.

A cast metallic cover 58, Fig. 7, is provided to cover the receiver head 20 when the unit is not in use, thereby preventing surreptitious tampering and the like. Threaded studs 60 carried by said cover are adapted to extend through apertures 62, provided in top wall 16. Suitable fastening means, such as nuts, not shown, will securely retain the cover in position by engagement with threaded studs 60.

Inspection plate actuating means

The means whereby inspection plate 26 is moved from its closed position of Fig. 4 to its open or fare releasing position, and vice versa, will now be described.

A turnstile, generally designated at 64, and of standard construction, comprises three stiles, whereby each time the turnstile is actuated, main turnstile shaft 66 is rotated one-third of a revolution. As seen clearly in Fig. 3, shaft 66 has secured thereto adjacent its inner end a three point cam 68. A spring loaded plunger shaft 70, slidably mounted to the turnstile housing as by brackets 72, engages cam 68 by means of roller 74. Spring 76 and collar 78 cooperate to maintain shaft 70 biased against cam 68 at all times.

Figure 3:
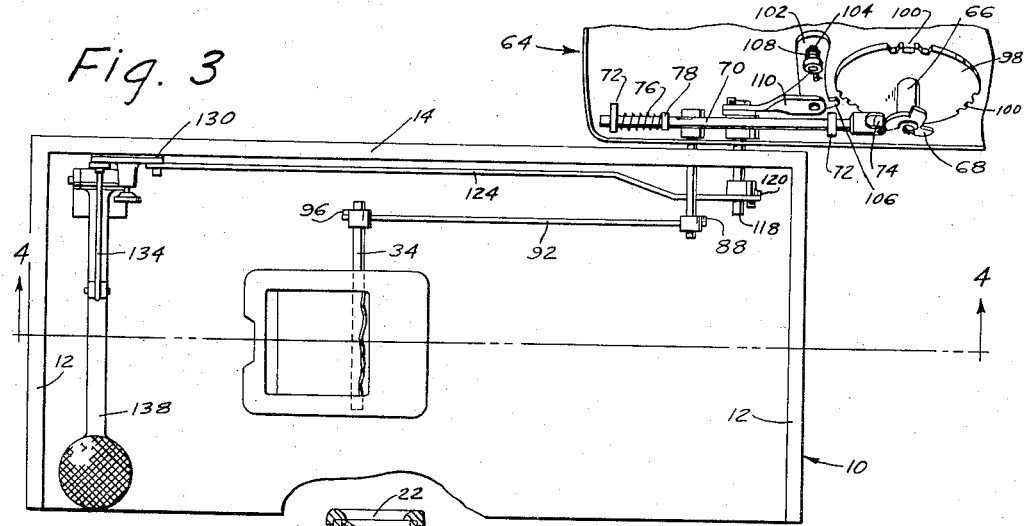
Fig. 3 is a fragmentary plan view, partly in perspective on an enlarged scale, of the fare collection means and turnstile mechanism embodied in my invention, with their respective covers removed.

Figs. 3 and 4 represent the normal position of turnstile shaft 66, namely, that at which inspection plate 26 is closed. Upon actuation of turnstile 64 and resultant movement of shaft 66 through one-third of a revolution, shaft 70 will be caused to reciprocate, due to the coaction between spring 76 and cam 68.

A pin 80 is secured to shaft 70 and its free end engages one end of a link 82 as at slot 84. The opposite end of link 82 is secured to rock shaft 86 which in turn fixedly carries another link 88. Pivoted to link 88 as at 90 is an elongated arm 92 which in turn is pivotally connected, as at 94, to link 96, which is secured to rock shaft 34. Thus as shaft 70 moves to the right, looking at Figs. 3 and 4, link 82 will impart a clockwise rotation to rock shaft 86. This in turn, by means of link 88, arm 92 and link 96 will impart a clockwise rotation to rock shaft 34, whereupon roller 32 will move away allowing inspection plate 26 to drop open by gravity, while at the same time, the lower end of baffle 30 will block off the chute 28. During the return stroke of shaft 70, the operation will be reversed and the parts will return to the position of Figs. 3 and 4, thereby completing the cycle.

Turnstile locking means

In accordance with this invention, means are provided for selectively locking the turnstile against rotation, said locking means being operable by an attendant.

Referring to Fig. 3, there is provided a lock disc 98, which disc is fixedly secured to shaft 66. Spaced around the periphery of disc 98 are three groups of teeth 100, it being noted that each group of teeth is in substantial registry with the high points of cam 68. A locking pawl 102 is pivotally mounted to the turnstile housing as at 104 and carries a locking finger 106 adapted to engage the teeth 100 to retain shaft 66 against rotation and accordingly lock the turnstile. Locking pawl 102 is normally biased to inoperative position by coil spring 108.

A link 110 is pivoted to pawl 102 as at 112, said link in turn being pivotally connected to connecting arm 114 as at 116. Arm 114 is secured to a rock shaft 118 which in turn carries arm 120. Pivoted to arm 120 as at 122 is a link 124, which at its opposite extremity is pivotally connected as at 126 to a quadrant disc 128. Disc 128 is mounted for rotation on a quadrant plate 130, as at 132, and plate 130 is secured to wall 14 by any desired means, note Fig. 3. A treadle link 134 is pivotally attached to disc 128 as at 136, said treadle link at its lower end being operably connected to a treadle 138.

As will be obvious from Fig. 4, when the attendant steps on treadle 138, link 134, disc 128, link 124 and arm 120 will cooperate to impart a clockwise rotation to rock shaft 118, which in turn will move locking pawl 102 to its operative or locking position against the action of spring 108. Upon release of the treadle, spring 108 will return the parts to the position of Fig. 3.

Figure 5:
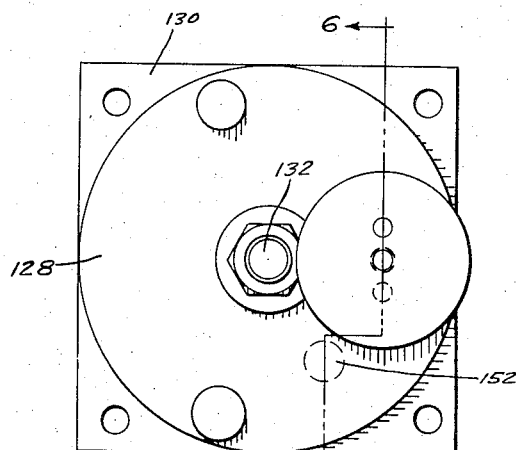
Fig. 5 is a front elevation, on an enlarged scale, of the quadrant assembly embodied in my invention.
Figure 6:
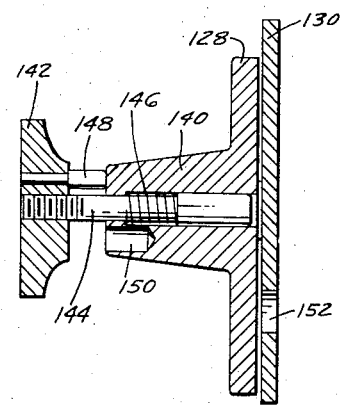
Fig. 6 is a section taken along line 6—6 of Fig. 5.

In the event that it is desired to maintain pawl 102 in locking position for an extended length of time, means are provided for permanently retaining the treadle in its downwardly pressed position. Referring to Figs. 5 and 6, it will be noted that quadrant disc 128 has an off-center projection 140 which slidably carries a knob 142 by means of rotatable shaft 144. The knob 142 is retained in its outermost position of Fig. 6, against the action of spring 146 by means of pin 148. However, when knob 142 is rotated so that pin 148 registers with a bore 150 provided in projection 140, spring 146 will urge the knob inwardly, whereupon the free end of shaft 144, upon proper positioning of disc 128, will enter an opening 152 provided in plate 130. This will lock disc 128 against rotation, it being understood that opening 152 is so positioned that when the disc 128 is locked, pawl 102 will be in locking position.

Operation

Although it is thought that the operation of the instant invention will be apparent from the foregoing description, a brief summary will now be made.

Under normal operating conditions, the quadrant assembly will be in the position of Fig. 6, namely, disc 128 will be free to rotate. Upon approaching the barrier or turnstile 64, the depositor will drop his fare into receiver head 20. Due to the specific construction of the receiver head, as fully disclosed in my afore referred to copending application, the parts of the fare will be scattered for quick visual inspection by the attendant stationed at the unit. If the fare is not correct, the attendant merely steps on treadle 138, thereby locking the turnstile against rotation in the manner aforedescribed. If, on the other hand, the fare is correct, the depositor rotates the turnstile and passes through, said rotation automatically releasing inspection plate 26.

When the turnstile is not in use, cover 58 is secured over receiver head 20 and knob 142 and disc 128 are rotated to locking position.

Thus it will be seen that there is provided in accordance with this invention means whereby the passage of a depositor through any sort of restricted passageway automatically clears the inspection plate upon which the fare has been deposited. And although the invention has been described making particular reference to a turnstile, it will be appreciated that other forms of mechanical barriers could well be utilized. Furthermore, clearance of the inspection plate could be mechanically actuated by a treadle (not shown) upon which the depositor must step in moving through the passageway. On the other hand, depression of the treadle by the depositor could close a circuit, thereby energizing a solenoid for actuation of the inspection plate. Still another variation of the basic concept of this invention would be the provision of an electric eye device (not shown) whereby passage of the depositor would break the beam thereby actuating the inspection plate by means of a solenoid or the like.

Referring to Figs. 1 and 4, it will be seen that rollers 154 are secured to the bottom of the fare cabinet and turnstile housing whereby the entire assembly forms a compact unit easily portable from place to place. For example, state and county fairs and athletic events and the like will particularly benefit from the provision of a portable and compact unit of this type. Also, the basic concept of this invention is adaptable to toll bridges and virtually all other situations where a fare is exacted in return for the passage of a depositor or vehicle.

While there is shown and described herein certain specific structure embodying the invention it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. In combination with a fare box having an inspection area and a container mounted therebelow, means for releasing inspected fares to the container, a barrier adapted on occasion selectively to obstruct passage of a depositor past said fare box, said barrier being normally unlocked and movable to permit passage of a depositor therethrough, and means automatically responsive to movement of said barrier for actuating said fare releasing means.

2. The combination of claim 1 further characterized in that said fare box has a relatively large drop inlet for receiving and directing multiple throw fares to said inspection area, and means for separating the fare parts therein for rapid and effective visual inspection.

3. The combination of claim 2 further comprising means operable from adjacent said fare box for selectively locking said barrier against movement.

4. In combination, a fare box having a relatively large drop inlet for the simultaneous reception of a plurality of fare parts and further having a movable inspection plate onto which the fare parts drop for quick visual inspection, the combination further comprising a turnstile normally freely rotatable to permit passage of a depositor therethrough, cam means carried by said turnstile and rotatable therewith, and means controlled by said cam means for moving said inspection plate to effect the clearance thereof each time the turnstile is rotated.

5. The combination of claim 4 further comprising means located adjacent said fare box for selectively locking said turnstile.

6. The combination of claim 5 wherein said locking means comprises a toothed disc mounted on the turnstile shaft, a pivotally mounted locking pawl normally biased to inoperative position, and means for selectively moving said pawl into locking engagement with said disc.

References Cited in the file of this patent

UNITED STATES PATENTS

| | | |
|---|---|---|
| 503,985 | Rice | Aug. 29, 1893 |
| 581,322 | Winters | Apr. 27, 1897 |
| 1,350,958 | Davis | Aug. 24, 1920 |
| 1,406,788 | Weinman | Feb. 14, 1922 |
| 1,853,815 | Jackson | Apr. 12, 1932 |
| 2,542,876 | Main | Feb. 20, 1951 |
| 2,714,264 | Odell | Aug. 2, 1955 |